(No Model.) 2 Sheets—Sheet 1.

D. F. KAIN.
TWO WHEELED VEHICLE.

No. 421,579. Patented Feb. 18, 1890.

Witnesses
W. R. Edelen.
Geo. W. King.

Inventor
David F. Kain
By Leggett & Leggett
Atty's (No Model.) 2 Sheets—Sheet 2.

D. F. KAIN.
TWO WHEELED VEHICLE.

No. 421,579. Patented Feb. 18, 1890.

WITNESSES
W. R. Edelin.
Geo. W. King

INVENTOR
David F. Kain
By Leggett & Leggett
ATTORNEYS

UNITED STATES PATENT OFFICE.

DAVID F. KAIN, OF ALBION, INDIANA.

TWO-WHEELED VEHICLE.

SPECIFICATION forming part of Letters Patent No. 421,579, dated February 18, 1890.

Application filed September 30, 1889. Serial No. 325,532. (No model.)

*To all whom it may concern:*

Be it known that I, DAVID F. KAIN, of Albion, in the county of Noble and State of Indiana, have invented certain new and useful Improvements in Two-Wheeled Vehicles or so-called "Road-Carts;" and I do hereby declare the following to be a full, clear, and exact description of the invention, such as will enable others skilled in the art to which it pertains to make and use the same.

My invention relates to improvements in two-wheeled vehicles or so-called "hammock road-cart;" and it consists in certain features of construction and in combination of parts hereinafter described, and pointed out in the claims.

Figure 1:
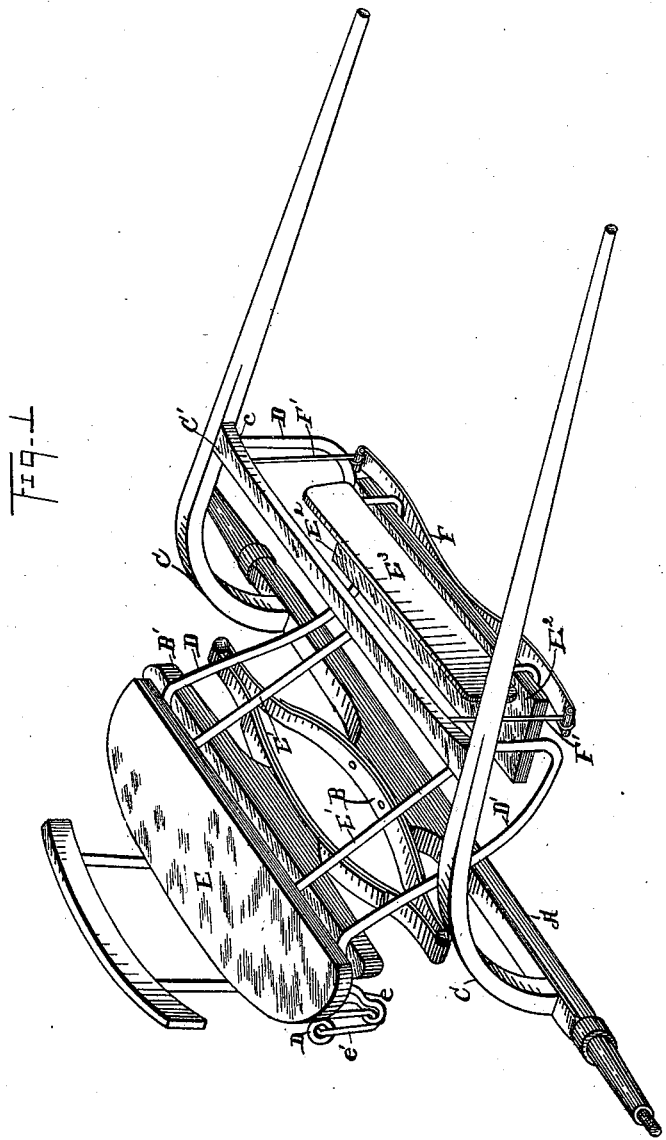
Figure 2:
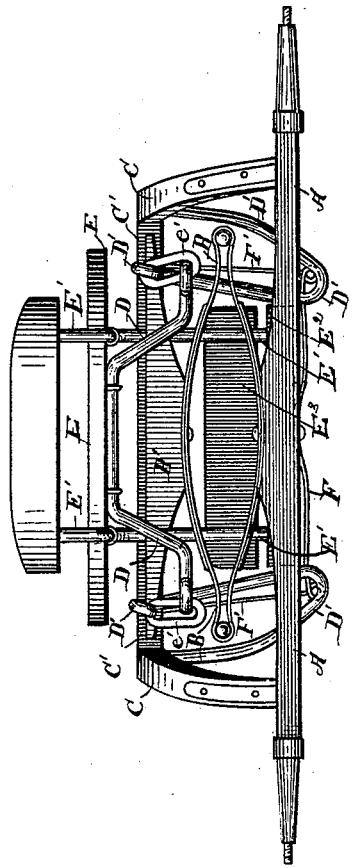

In the accompanying drawings, Figure 1 is a view in perspective, the wheels of the vehicle being omitted. Fig. 2 is a rear end elevation.

A represents the axle; B, the spring, the latter having attached in the usual manner bar B'.

C are the thills, and C' the cross-bar of the thills.

D' are rods or so-called "side bars," the forward ends of which usually bend so as to hook into eyebolts $c$, connecting with cross-bar C'. Rods D' curve downward at $d$, so as to be out of the way, and rearward of such curve these bars extend across and rest on top of the spring-bar B', to which rods D' are fastened, the rear ends of rods D' extending some little distance rearward of the spring-bar B'.

E is the seat, the same being rigidly connected by means of rods E' with the foot-rest $E^2$ and dash-board $E^3$, these members constituting the body of the vehicle. From the seat depend brackets D, these brackets being connected, as shown, by links $e'$ with the rear or overhanging ends of side bars D' aforesaid.

F is a semi-elliptic spring consisting usually of a single leaf. This spring at the longitudinal center thereof is fastened to the under side of foot-rest $E^2$. The ends of this spring are pivotally connected by means of rods F' with cross-bar C', the latter being provided with eyebolts or staples for engaging the upper hook ends of these rods. With such construction the body of the vehicle may swing in any direction, and is therefore little affected by the movement of the horse and rides remarkably easy.

What I claim is—

1. In two-wheeled vehicles, the combination, with thills and cross-bar, axle, spring, and spring-bar, substantially as indicated, side bars connected with the cross-bar of the thills and extending from thence across and resting on the spring-bar, of vehicle-body having depending brackets connected by links with the overhanging ends of the side bars, the forward end of the body being supported from the cross-bar of the thills by meads of rods engaging a semi-elliptic spring connected with the forward end of the vehicle-body, substantially as and for the purpose set forth.

2. In two-wheeled vehicles, the combination of side bars resting on and extending rearward of the axle spring-bar, vehicle-body having depending brackets extending below the free end of the side bars, the side bars and brackets being connected by links, substantially as set forth.

3. In two-wheeled vehicles, the combination of side bars connected with the cross-bar of the thills, such side bars extending across and resting on the axle spring-bar, and links connecting the rear end of the side bars with brackets depending from the rear of the vehicle-body, substantially as set forth.

In testimony whereof I sign this specification, in the presence of two witnesses, this 25th day of July, 1889.

DAVID F. KAIN.

Witnesses:
HENRY G. ZIMMERMAN,
WILLIAM S. KISER.